July 9, 1968 W. J. HARMS 3,391,440
MECHANICAL TYING TOOL
Filed March 21, 1966 5 Sheets-Sheet 1
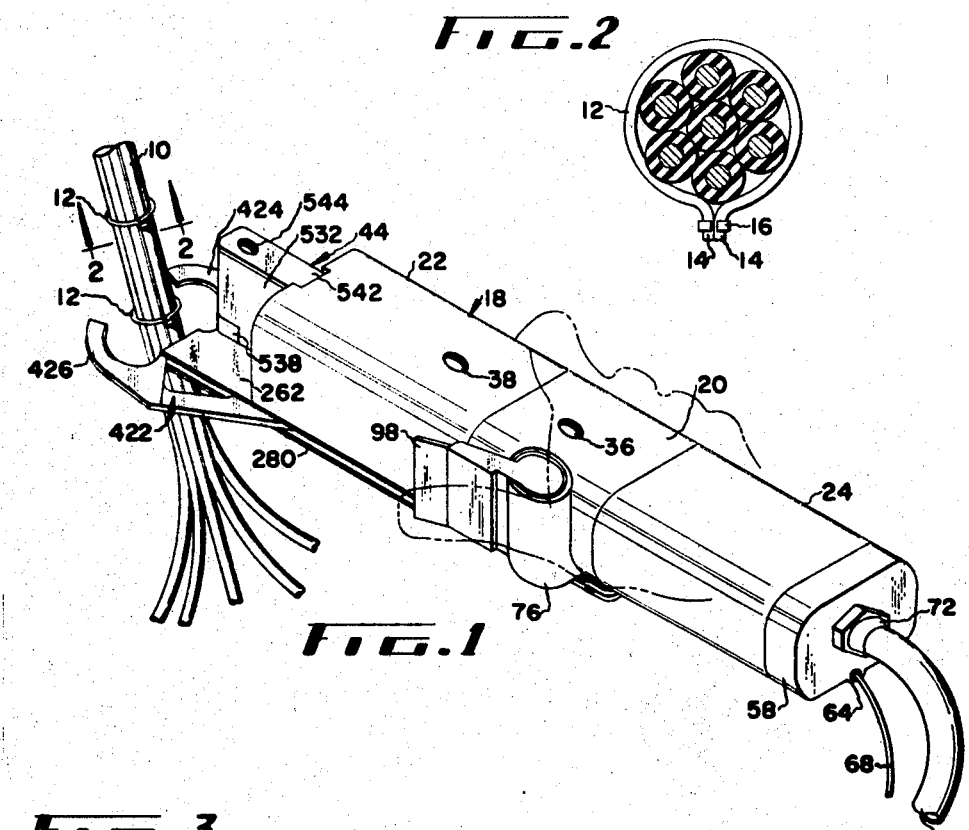
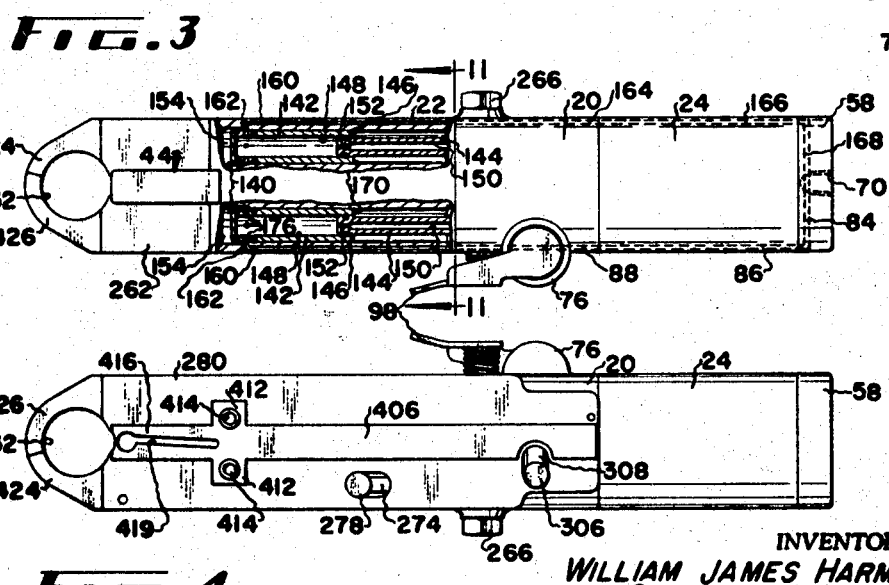
INVENTOR.
WILLIAM JAMES HARMS
BY Joseph W. Holloway
ATTORNEY

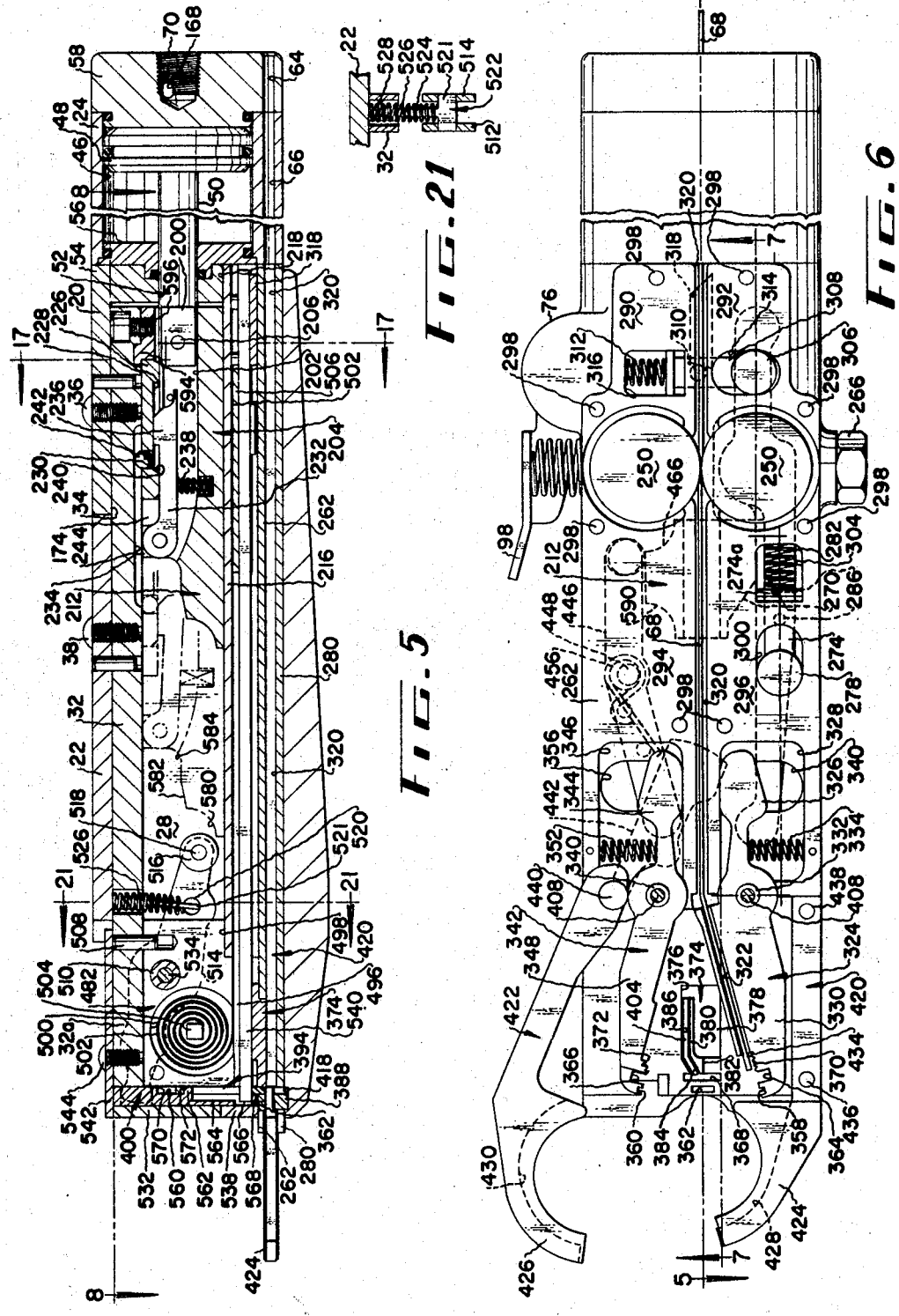

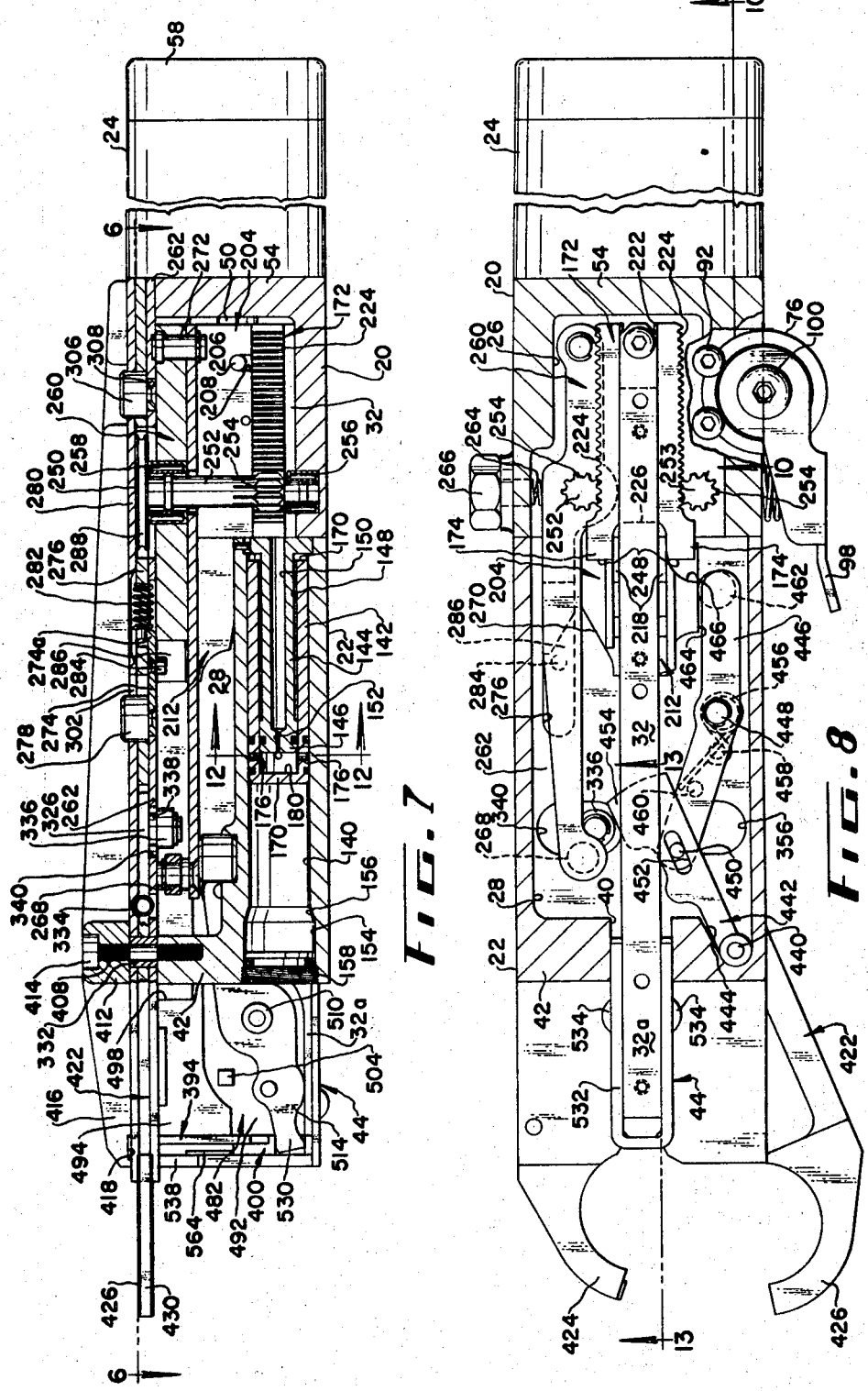

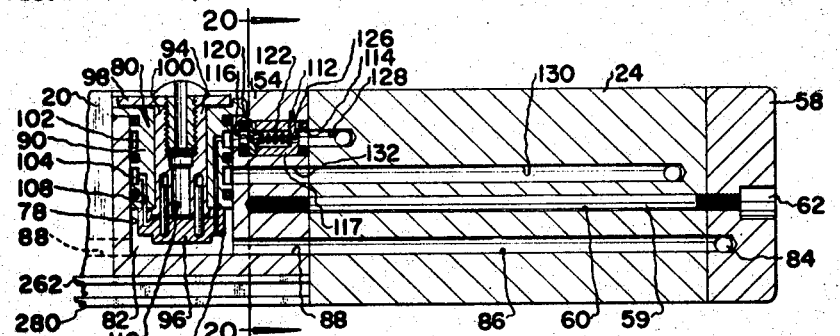
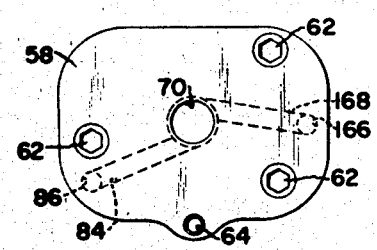
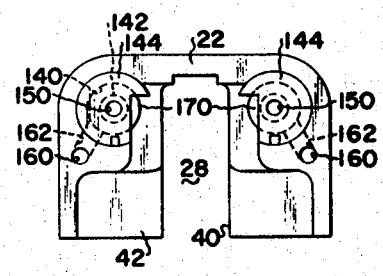
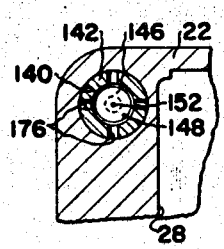
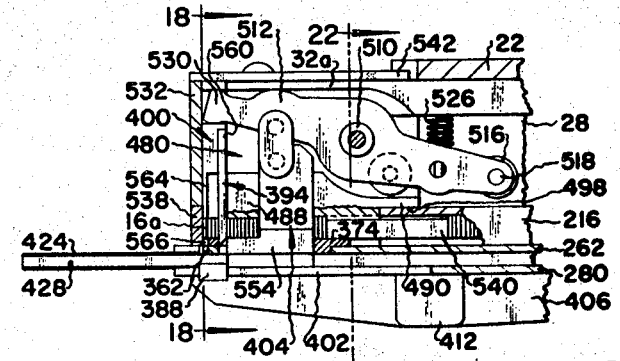
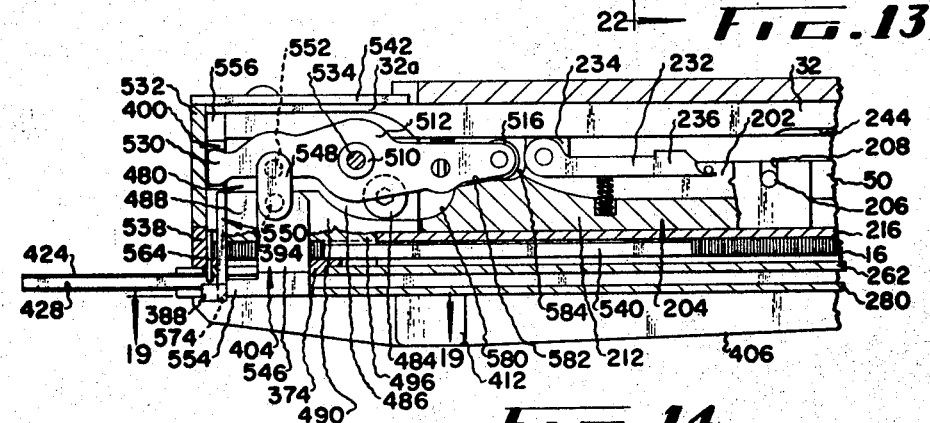

United States Patent Office 3,391,440
Patented July 9, 1968

---

3,391,440
MECHANICAL TYING TOOL
William J. Harms, Spring Lake, Mich., assignor to Gardner-Denver Company, a corporation of Delaware
Filed Mar. 21, 1966, Ser. No. 535,798
10 Claims. (Cl. 29—203)

ABSTRACT OF THE DISCLOSURE

A mechanical tying apparatus for assembling a tie in a loop about an article including a linearly powered cam sequentially cooperable with various operating elements of the apparatus to feed, guide, pull, clamp, fasten and cut the tie.

---

This invention generally pertains to an improved mechanical tool for applying a tie about one or more articles. While there are innumerable practical applications for such a tool, the hereinafter described embodiment of my invention is particularly well suited for binding or tying a plurality of loose electrical wires in bunched parallelism to form a cable. More particularly, the invention concerns improvements in mechanical binding tools of the type which function to apply flexible, nonmetallic ties along a length of cable at spaced intervals.

Heretofore developed tying tools function to feed the tie in a loop around a bundle of loose wires, to draw the loop tightly about the bundle, and to clamp the ends of the loop about the bundle prior to severing the loop from a stock of tying material. These operations must be completed very rapidly and with a high degree of reliability in order that mechanical tying tools may compete with manual cable lacing techniques. However, known mechanical devices capable of performing the aforementioned operations with speed and reliability exhibit such complexity in structure and operation that the manufacture and maintenance of such tools is extremely costly; moreover, the physical size and weight of such tools exceed practical limits for a portable, hand-held device of the type required in most industrial applications.

Therefore, the principal object of this invention is to provide an improved mechanical tying tool of the aforedescribed type in which the above noted structural and operational disadvantages are obviated.

Another object is to simplify structurally the operating mechanism of such a tool in order to decrease the size, weight and cost thereof without eliminating desirable functional features of the mechanism.

Yet another object is to increase the speed and operational reliability of such a tool by means of an improved mechanism for actuating the loop feeding, tightening and clamping assemblies of the tool.

Still another object is the provision of a main actuating mechanism for the tool which generally comprises a single cam block powered for linear reciprocation along the longitudinal axis of the tool.

A specific object of this invention is the provision of a pressure fluid actuated loop tightening mechanism which will positively draw the loop about wire bundles of varying diameters without employing a mechanically troublesome clutch and without adjustment of the mechanism.

Another specific object is the provision of safety means for interrupting the tying cycle should the tie guiding hooks at the front of the tool fail to close completely about the cable due to one or more loose wires being accidentally caught between the hooks.

Still another specific object is the provision of a mechanical scrap ejector device which acts in concert with the loop clamping and severing assemblies for positively expelling the severed end portion of a loop from the interior of the tool housing.

These and other objects and advantages will be better understood upon reading the following detailed description of the invention in connection with the attached drawings, in which:

FIGURE 1 is a perspective view of a tool constructed in accordance with the present invention showing the tool as it would be held in an operator's hand for proper positioning with respect to a bundle of wires about which a tie is to be applied;

FIG. 2 is a view taken along lines 2—2 through a tied bundle of wires shown in FIG. 1;

FIG. 3 is a top view of the tool shown in FIG. 1 with a portion of the housing broken away to show the details of a pair of power cylinders;

FIG. 4 is a bottom view of the tool shown in FIGS. 1 and 2;

FIG. 5 is a longitudinal sectional view taken substantially along lines 5—5 of FIG. 6;

FIG. 6 is a view taken generally along lines 6—6 of FIG. 7;

FIG. 7 is a partial sectional view taken substantially along lines 7—7 of FIG. 6;

FIG. 8 is a partial sectional view taken substantially along the lines 8—8 of FIG. 5;

FIG. 9 is an end view, looking from right to left, of the tool shown in FIG. 10;

FIG. 10 is a fragmentary sectional view taken substantially along lines 10—10 of FIG. 8;

FIG. 11 is an end view of a front housing block taken along lines 11—11 of FIG. 3;

FIG. 12 is a fragmentary sectional view taken generally along lines 12—12 of FIG. 7;

FIG. 13 is a fragmentary sectional view similar to FIG. 5 and showing details of the stapler assembly;

FIG. 14 is a view similar to FIG. 13 showing certain operating parts of the tool in their actuated condition;

FIG. 21 is a partial sectional view taken substantially along lines 21—21 of FIG. 5.

Figure 15:
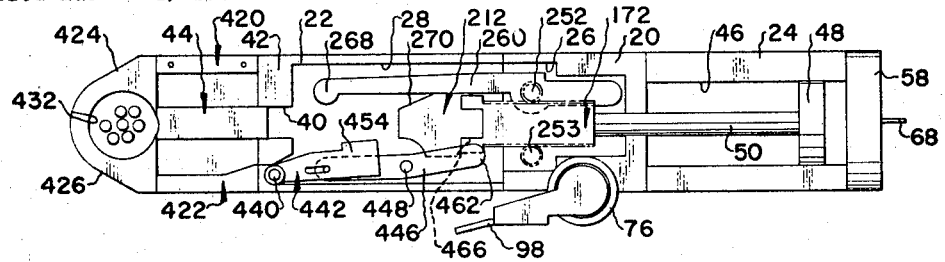
FIG. 15 is a schematic view wherein certain parts of the tool shown in FIG. 8 have been moved to actuated positions.

As previously noted, one objective of the present invention is to provide an improved mechanical tying tool for applying a flexible tie about a plurality of loose articles such as the bundle 10 of insulated electric wires shown in FIG. 1. A pair of completed ties or loops 12 are shown in FIG. 1 where the tying tool is being manually positioned in proper relation with respect to the bundle 10 of wires for initiating another tying cycle of the tool. FIG. 2 shows that each completed tie 12 comprises a loop which is drawn tightly about the wire bundle 10 and that the ends 14 of the loop are held together by a crimped metal staple 16. While the described tool is adapted to apply ties made of any suitably strong yet flexible material, particularly good results have been obtained where the tie material consists of one-sixteenth inch diameter, round polyvinyl chloride or an equivalent nonmetallic material.

Another stated object of this invention is to provide a tying tool having an operating mechanism which is less complex and more reliable than those developed heretofore for such tools. This objective is generally accomplished by means of a single cam block, indicated generally by numeral 204, that is driven by a pressure fluid cylinder for simple lineal reciprocation within the tool housing 18 in coacting relation with certain to-be-described operating mechanisms which cyclically provide the following tool functions:

Feeding a length of tie material in a loop about a bundle of wires;

Drawing the loop tightly about the bundle;

Holding the loop in a tensed condition about the bundle with the loop ends juxtaposed;

Stapling the ends of the loop together; and

Severing the stapled loop from the stock of tie material.

The above-mentioned cam block 204 and coacting operating mechanisms are principally received and supported in the plural-part tool housing, generally designated by numeral 18, which comprises a central block 20, a front block 22 and a cylinder block 24. These blocks are held in assembled end-to-end relation by fastening devices to be described. As shown in FIGS. 1, 9 and 11, the preferred transverse cross section of the tool is generally rectangular while the length of the tool is several times greater than its greatest cross sectional dimension. The approximate size of the tool is such that an operator's hand can substantially embrace the tool body in the manner shown in FIG. 1. The blocks 20, 22 and 24 are preferably formed of a lightweight metal such as aluminum and may be cast to approximate shape and size prior to final machining.

Throughout the following detailed description, reference will be made to the forward and rear portions of the tool and to forward and rearward movement of certain operating parts of the tool. As viewed in FIG. 1, the forward portion of the tool projects from the operator's hand toward the work piece 10 to which a tie 12 is to be applied.

Having reference to FIG. 8, it will be seen that the central block 20 and the front block 22 are substantially hollow and have cavities 26 and 28 which open toward one another. As shown in FIG. 5, a longitudinally extending keel member 32 has its rear end held within cavity 26 in fixed relation to the wall 34 of block 20 by means of a screw 36; and the front block 22 is removably secured to the keel 32 in assembled relation with block 20 by means of a screw 38. The front end 32a of the keel extends forward through a central slot 40 in the front wall 42 of the front block 22 to provide a mount for a stapler assembly, generally indicated by numeral 44.

The cylinder block 24 has a longitudinal bore 46 which provides an operating cylinder for a reciprocable piston 48 having an attached rod 50 extending forward through an aperture 52 in the rear wall 54 of the central block 20. A front head 56 sealably closes the front end of cylinder bore 46 and a rear head 58 sealably closes the rear end of the cylinder bore 46. The heads 56 and 58 provide stops for the travel of piston 48 which is powered for reciprocating movement by means of pressure fluid, such as compressed air, for example, as will be more fully explained. Three studs 59 extend rearward from the rear wall 54 of central block 20 through bores 60 in the cylinder block wall and through the rear head 58. Suitable nuts 62 are threaded to the rear ends of the studs 59 to secure the central block 20, the front head 56, the cylinder block 24 and the rear head 58 in properly assembled relation to one another. As shown in FIG. 5, the rear head 58 and the cylinder block 24 are provided with registering longitudinal apertures 64 and 66, respectively, which provide the rear portion of a passage through the tool housing for the tie material 68 shown in FIG. 1. The rear head is also provided with a threaded recess 70 for a suitable fitting 72 at the end of a flexible pressure fluid line 74.

Figure 20:
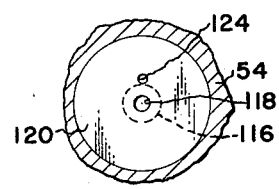
FIG. 20 is a partial sectional view taken substantially along lines 20—20 of FIG. 10.

A semicylindrical boss 76 is integrally formed on the central block 20 and projects laterally therefrom. As best shown in FIG. 10, boss 76 and the adjacent portion of the central block are bored out to provide a cylindrical cavity 78 for housing a rotary four-way valve assembly, generally indicated by numeral 80. The valve assembly 80 functions to supply pressure fluid alternatively to one end of the piston cylinder 56 and to exhaust the other end thereof for operating in the manner of a double-acting power cylinder. Pressure fluid under line pressure is communicated to the valve supply chamber 82 from the back head fitting recess 70 by means of a right-angle passage 84 in the rear head 58 and aligned longitudinal bores 86 and 88 in the cylinder block wall and the central block wall, respectively. A valve body 90 is fixed in cavity 78 by means of screws 92 which are threaded into the central block 20 in interfering relationship with complementary radial slots at the top of the valve body, as viewed in FIG. 8. A valve plug comprised of pinned together upper and lower members 94 and 96 is rotatable within the center bore of the valve body 90 by means of a spring-biased thumb lever 98 fastened to the upper valve plug member 94 by an axially bored screw 100. A spaced pair of radially opening, annular grooves 102 and 104 in the valve body 90 are adapted either to receive pressure fluid from the supply chamber 82 through a longitudinal passage 106 or to be exhausted through a longitudinal passage 108 which is in communication with atmosphere by means of a space between the upper and lower plug members, a central bore 110 in the upper plug member 94, and the aforementioned axially bored screw 100. The valve 80 is constructed in a well understood manner so that a small degree of rotation of the valve plug 94, 96 with respect to the valve body 90 will reverse the pressure-fluid supply and exhaust connections to the annular grooves 102 and 104 from that shown in FIG. 10 so that upper groove 102 is vented while the lower groove 104 is pressurized. With the thumb lever 98 released and the valve parts in the condition shown in FIG. 10, pressure fluid will flow from the upper groove 102 to the cylinder bore 46 through a flow regulating valve assembly 112 which is sealably seated in a bore 114 in the rear wall 54 of the central block 20. A ball 116 disposed in a cup 117 is biased by a light spring 122 to close a central aperture 118 in a front cap 120 for the cup 117. As shown in FIG. 20, the cap 120 also has an aperture 124 which is smaller than aperture 118 and offset therefrom. The closed end of the cup 117 is apertured at 126 to permit pressure fluid flow from the interior of the cup to the rear end of bore 114 and thence to an aligned passage 128 in the wall of cylinder block 24. Passage 128 opens radially into the cylinder bore 46 near the front end thereof to communicate pressure fluid to the front face of the piston 48 thereby forcing the piston to its rear stop position shown in FIG. 5. The described apertures 118, 124 and 126 and the spring 122 in the flow control valve 112 may be selectively sized to regulate the flow of air to and from the front portion of the power cylinder thereby providing means for independently controlling the rate of travel of the piston 48 in both the forward and rearward direction. With the valve 80 in the released position shown in FIG. 10 and with pressure fluid directed to the front face of piston 48, any pressure fluid trapped behind the piston will be vented to atmosphere from the rear end of the cylinder bore 46 by means of a passage 130 in the cylinder wall which opens to an aligned bore 132 in the central block 20 and thence into the lower groove 104 of the valve body 90.

When the thumb lever 98 is depressed to rotate the valve plug 94, 96, the front of the cylinder bore 48 will be exhausted through passage 128 and the flow control valve 112 while the rear of the cylinder bore will be supplied with pressure fluid through passages 130 and 132. The rate of forward travel of the piston will be related to the size of the aperture 124 since the ball 116 will cover aperture 118 and all of the exhaust from the front of the cylinder bore must pass through the small aperture 124.

As best shown in FIGS. 3 and 7, the front block 22 is provided with a pair of cylinder bores 140 which are disposed on opposite sides of the longitudinal center line of the front block 22. The bores 140 extend the full length of the front block 22; and, as shown in FIG. 11, at a point approximately midway of their length, the bores open laterally into the cavity 28 of the front block 22. A hollow piston 142 is slidable in each bore 140 between a rear position shown in FIG. 7 and a forward position shown in FIG. 3. Each piston 142 telescopes about an internal guide rod 144 which has a head 146 that sealably fits a central bore 148 in the piston 142. Each rod 144 also has a bore 150 and a metering aperture 152 through head 146 which communicates the interior of the piston bore 148 with the rod bore 150. The forward end portion 154 of each bore 140 is of greater diameter than a piston 142 and is connected to the smaller diameter portion of the bore 140 by a tapered wall 156. The extreme forward end of each bore 140 is sealed by a threaded plug 158. The enlarged forward end 154 of each cylinder bore 140 is constantly subjected to pressure fluid which is supplied thereto by longitudinal passages 160 in the opposite side walls of the front block 22. As shown in FIG. 3 the passages 160 open into each of the enlarged cylinder ends 154 through ports 162 in the tapered walls 156. As oriented in FIG. 3, the upper passage 160 communicates with a longitudinal passage 164 in the wall of the central block 20 which in turn communicates with the pressure fluid supply opening 70 in the back head 58 through passages 166 and 168 located in the wall of the cylinder block 24 and the back head 58, respectively. As viewed in FIG. 3, the lower passage 160 communicates with the aforementioned passage 88 in the side wall of the central block 20 which penetrates the valve cavity 78. The pressure fluid supply passages leading to the passage 88 have already been described in detail.

A portion of the annular rear surface 170 of each piston 142 is exposed in the housing cavity 28 where the cylinder bores 140 open through the adjacent wall portions of the cavity 28. During the operation of the tool, a rack 172 is driven forward in cavity 28 and the spaced arms 174 at the front of the rack are brought into driving engagement with the exposed rear surfaces 170 of the pistons 142. As the rack 172 moves forward from the full line position to the phantom line positions in FIG. 5, the pistons 142 are pushed forward in cylinder bores 140 from the position shown in FIG. 7 to that shown in FIG. 3 causing pressure fluid to be compressed in the enlarged forward ends of the cylinder bores. Under this condition, the trapped pressure fluid in the bores 140 acts as a spring tending to bias the pistons 142 and the abutting rack 172 rearwardly. When the rack 172 and the pistons 142 reach the forwardmost position of each, the rack is released, in a manner to be described, for free rearward travel; and pressure fluid from the enlarged ends 154 of the cylinder bores 140 is admitted to the interior of the piston bores 148 through plural radially opening ports 176 which have overridden the tapered wall portions 156. Thus pressure fluid will operate on the front surface 178 of the piston 142 as well as the closed front end surface 180 of the piston bore 148. Since the area of the surface 178 exceeds that of surface 180, the piston 142 will move rearward to close the ports 178 thereby trapping a quantity of pressure fluid in the forward end of the piston bore 148. The trapped pressure fluid is bled from the piston bore 140 through the metering aperture 152 in the guide rod head 146 to the guide rod bore 140 and thence to the cavity 26 in the central block 20. In this manner, the rate of rearward movement of the pistons 142 due to the differential pressure acting on the ends of the pistons can be controlled by sizing the diameter of the metering aperture 152 as desired.

A flat apertured end 200 of the piston rod 50 projects into the central block cavity 26 and is received in the rear of a longitudinal slot 202 opening to the top of a cam block 204, as viewed in FIG. 5. A cross pin 206 penetrates the aperture in the rod end 200 and has outwardly extending portions which engage with a pair of transversely aligned slots 208 in the spaced side walls 210 of the longitudinal slot 202 to form a driving connection between the piston rod 50 and the cam block 204. The forward end of the cam block has a head 212 upon which are formed several cam surfaces which will be described. The head 212 has a downwardly opening slot 214, as viewed in FIG. 17, which has walls which bear upon an inverted U-shaped staple channel 216. The channel 216 seats at its rear end in a slot 218 relieved in the rear wall 54 of the central block 20 and the front end of the channel 216 is received and supported by the staple assembly 44. The slot 214 and the channel 216 coact to support and guide the cam block 204 for lineal movement along the longitudinal center line of the tool housing 18. On the upper surface of the cam head 212, as viewed in FIG. 8, a pair of spaced guide ears 218 are provided for engagement with the side walls of the aforedescribed keel 32 to further support and guide the cam block 204. From the foregoing it will be understood that the cam block 204 slides with respect to the staple channel 216 and the keel 32 for reciprocating movement within the cavities 26 and 28 when the piston 48 is reciprocated in the cylinder block 24.

The aforementioned rack 172 has a shallow longitudinal slot 222 which partially receives the keel 32 which in turn guides and supports the rack for sliding movement therealong. The toothed sides 224 of the rack 172 are spaced by a body or web portion 226 which extends for less than the full length of the rack. The body portion 226 overlies the rearwardly extending tail portion of the cam block 204 and is slidable relative thereto. As viewed in FIG. 5, one side of the body portion 226 is provided with an enlongated groove 228 which groove opens to the other side of the body portion through an aperture 230. A hook 232 disposed in the cam block slot 202 is pivotally mounted between a pair of spaced arms 234 extending from the cam block head 212. With the tool parts in the condition shown in full lines in FIG. 5, the head 236 of the hook 232 is biased into the groove 228 by a spring 238. Thus the hook head 236 will engage with the front wall 240 of the groove 228 when the cam block 204 is moved forwardly relative to the rack 172; and, thereafter the rack will be dragged forwardly by the cam block until the hook and slot connection is released. A ball 242 is shiftably disposed in the aperture 230 and may extend into an elongated groove 244 longitudinally relieved in the keel 32. If the ball should drop into the groove 228 between the disengaged hook head 236 and the front wall 240 of groove 228, the ball will be forcibly ejected therefrom when the space between the hook head and the wall 240 is taken up due to forward cam block movement. With the hook 232 and the rack 172 engaged, forward movement of the cam block 204 will move the ball 242 forwardly in groove 244 and will eventually cause the ball to be pushed out of the groove 244 at its front end. When this condition occurs, the ball will engage with the hook head 236, which underlies the aperture 230, thereby depressing the hook head against the spring 238 and out of driving engagement with the rack groove 228, in the manner shown in phantom lines in FIG. 5. Thus it will be understood that the hook 232 provides a releasable driving connection between the cam block 204 and the rack 172 which is effective to move the rack forwardly a determinable distance with the cam block and then to release the rack from the cam block.

As best seen in FIG. 8, a pair of arms 174 extend forwardly from the rack body 226 to the sides of the arms 234 on the cam block head 212. These arms 174 terminate in forward surfaces 248 which are engageable with the rear end surfaces 170 of the pistons 142 disposed in the cylinders 140. In a manner hereinbefore described the pistons are operable to push the rack 172 rearward when the latter is disengaged from the cam block 204.

The principal function of the rack 172 is to drive a pair of tie-feeding wheels 250. The wheels have respective shafts 252 and 253 upon which are formed pinions 254 which are drivably engageable with the teeth 224 of the rack 172. As best seen in FIG. 8, the rack 172 is disposed between pinions 254 and will drive the wheels 250 in opposite directions upon movement of the rack. The shaft 252 is tiltably journaled at one end by a bearing 256 seated in the wall of central block 20. The other end of shaft 252 is journaled by a bearing 258 carried by a pivoted wheel-release arm 260 to be described. The shaft 253 is journaled at one end in a bearing, not shown, in the wall of the central block 20 in the same manner as the corresponding end of the shaft 252. The other end of the shaft 253 is journaled by a bearing, not shown, which depends from an inner plate 262 into the central block cavity 20. As shown in FIG. 7, the shaft 252 extends through the bearing 258 in the wheel-release arm 260. FIG. 8 shows that a spring 264 extends through the wall of central block 20 and is constrained between an adjusting nut 266 and one side surface of the release arm 260. Thus the spring 264 functions to bias the release arm 260 and shaft 252 so that the pinion 254 of shaft 252 engages with the rack teeth 224. When the cam block 204 is in its forwardmost position, a roller 268 carried at the front end of the release arm 260 is engaged by a cam surface 270 on the cam block head 212 causing the arm 260 to move laterally toward the adjacent side wall of the front block cavity 28 about a pivot pin 272 secured to the plate 262 and projecting into the central block cavity 26. Such pivotal movement of arm 260 causes the wheel shaft 252 to tilt about its end that is journaled in bearing 256 whereby the pinion 254 is tilted out of engagement with the rack 172. A second device for pivoting the arm 260 for releasing the rack and pinion drive connection comprises a slide bar 274 disposed in an elongated opening 276 in the inner plate 262 and being manually operable by an attached push button 278 which extends through an outer plate 280. When the slide bar 274 is pushed rearwardly against the bias of an associated return spring 282, a pin 284 depending from the slide bar engages with a sloping cam surface 286 formed on the wheel release arm 260 in such a manner as to pivot the arm 260 for tilting the pinion 254 out of engagement with the teeth of the rack 172.

The aforementioned feeding wheels 250 normally have their peripheries pressed into engagement by the spring 264; however, a passage for the round tie material is formed between the radially opening, semicircular grooves 288 in the wheels. This passage between the wheels is made smaller than the cross section of the tie material so that the wheels resiliently grip the tie material and are therefore capable of feeding the tie material when the wheels are rotated by the rack 172.

The aforementioned inner and outer plates 262 and 280, respectively, have the same peripheral outline and serve to close the lateral openings of cavities 26 and 28. The plates 262 and 280 also have forward portions which extend beyond the front end wall 42 of the front block 22 and underlie the stapler assembly 44. Four spaces 290, 292, 294 and 296 are disposed between the inner and outer plates 262 and 280 and are held in position by locating pins 298 which project from the spacers into aligned apertures in the inner plate 262. As shown in FIGS. 6 and 7, the wheels 250 are disposed in cavities defined by the inner plate 262, the outer plate 280 and the spaced concave ends of the spacers 290, 292, 294 and 296. The aforedescribed wheel release button 278 projects from the slide bar 274 outwardly through an elongated opening 300 in the spacer 296 and through an identically shaped opening 302 in the outer plate 280. The spring 282 is disposed in an opening 304 in spacer 296 and is constrained at its ends by a portion of the wall of opening 304 and by the upturned end 274a of the slide bar 274. A staple rod release button 306, which is identical to the wheel release button 278, and its associated slide bar 308, pin 310, and spring 312 are mounted in spacer openings 314 and 316 in the same manner as just described with reference to the wheel release button. The slide bar 308 moves at right angles to the longitudinal center line of the housing 18 and selectively engages with or releases a locking block 318 for a purpose to be described. A channel 320 is generally defined by the facing inboard edges of spacers 290, 292, 294 and 296. The rear end of channel 320 is aligned with passage 66 in the cylinder block; and, the front end of the channel 320 opens in substantial alignment with a guide groove 322 in a lower clamping lever 324. The tie material 68 is intended to be guided by the channel 320 so that the tie passes between and in contact with the wheels 250 for powered feeding in a loop 12 about the bundle 10 of wires shown in FIG. 16.

The lower clamping lever 324 has its rear portion 326 disposed in a forwardly opening cut-out portion 328 of the spacer 296 while its front end portion 330 extends forwardly between the inner and outer plates 262 and 280, respectively. The lower clamping lever 324 is pivoted near its midpoint on a pivot post 332 projecting from the inner plate 262. The lever 324 is normally pivoted to the open condition shown in FIG. 6 by a spring 334 which is constrained between a wall of the cut-out portion 328 and the rear end portion 326 of the lever 324. A cam roller 336 is rotatably carried by the rear portion 326 of lever 324 on a shaft 338 which extends through an elongated opening 340 in the inner plate 262 into the front block cavity 28. The upper clamping lever 342 has its rear portion 334 disposed in a cut-out portion 346 of the spacer 294 while the front portion 348 of lever 342 extends forwardly between plates 262 and 280 to the same extent as the lower clamping lever 324. The upper lever 342 is pivoted on a pivot post 340 projecting from the inner plate 262. The lever 342 is normally biased to the open condition shown in FIG. 6, by a spring 352 acting on the rear portion 344 thereof. A cam roller 354 identical to cam roller 336 is carried at the rear end 344 of the lever 342 and projects into the front block cavity 28 through an elongated opening 356 in the inner plate 262.

Figure 16:
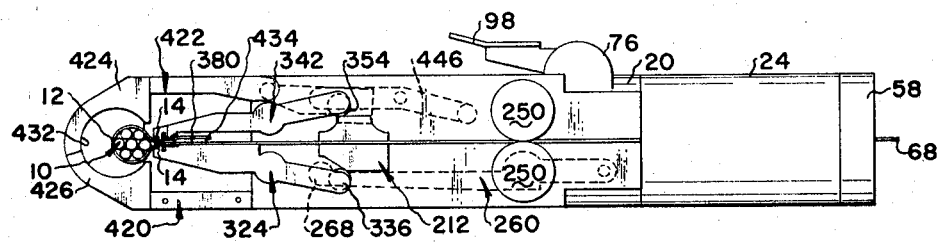
FIG. 16 is a schematic view wherein certain parts of the tool shown in FIG. 6 have been moved to actuated positions.

The front portions 330 and 348 of the clamping levers 324 and 342, respectively, are provided with opposed slots 358 and 360 which, when the levers are closed as in FIG. 16, register with the ends of a rectangular hammer opening 362 in the inner plate 262. Opposed slots 364 and 366 in the levers 324 and 342 register with the ends of a rectangular cutter blade opening 368 in the inner plate 262 when the levers are closed as in FIG. 16. Levers 324 and 342 are provided with serrated clamping surfaces 370 and 372 which coact with a clamping block 374 in a manner to be described. The clamping block 374 is disposed in an opening 376 in the inner plate 262 and comprises a deck portion 378 which is flush with the surface of the inner plate 262 and an angular wall portion 380 which projects outwardly from the inner plate 262 into contact with the outer plate 280. When the levers 324 and 342 are closed, the wall portion 380 stands upright between the levers and provides surfaces 382 and 384 which coact with the serrated clamping surfaces 370 and 372, respectively, for firmly clamping the ends 14 of a loop 12 of tie material as will be explained. An ejector slot 386 is defined between the margins of the opening 376 and the clamping block 374 and opens at its forward end into the blade opening 368 in the inner plate 262.

A generally U-shaped anvil 388 is disposed in an opening 390 in the outer plate 280 and projects inwardly into the space between the inner and outer plates 262 and 280. The space between the arms 392 of the anvil 388 is adapted to receive the lower portion of a cutter blade 394 as shown in FIG. 14. A staple bending recess 396 is relieved in the anvil 388 and such recess 396 coacts with a staple hammer 400 to bend a staple 16 about the ends of a loop 12 as shown in FIG. 2. A slot 402 in the outer plate 280 is aligned with the aforedescribed ejector slot 386 and provides an opening through which a push plate 404 ejects the severed scrap ends of a tie from the tool housing 18.

A cross-shaped beam 406 is intended to clamp the inner plate 262, the spacers 290, 292, 294 and 296, and the outer plate 280 is assembled relation to one another and to the front block 22. For this purpose a pair of studs 408 are anchored in the front wall 42 of the front block and project therefrom through central bores in the pivot posts 332 and 350 and through aligned apertures in the oppositely extending cross arms 412 of the beam 406 for threaded engagement with nuts 414. The forward portion 416 of the beam 408 underlies the staple assembly 44 and has a transverse slot 418 which receives and supports the anvil block 388 in proper relation to the hammer 400. An elongated aperture 419 opens through the beam in general alignment with the scrap ejector slots 386 and 402.

A fixed hook 420 and a movable hook 422 extend forwardly from between the inner and outer plates 262 and 280. The hooks have heads 424 and 426 which have guide channels 428 and 430 opening radially inwardly. When the hooks are closed as shown in FIGS. 15 and 16, the inner margins of the walls of the guide channels coact to define a substantially circular opening 432 for receiving a number of loose wires to be tied. The rear of the guide channel 428 opens toward the forward end of the guide groove 322 in the lower clamping lever 324 and as it is fed by the wheels 250 the leading end 434 of tie material will emerge from the groove 322 and will enter the rear of the guide channel 428.

The hook 420 is held in fixed relation between the plates 262 and 280 by a first pin 436, which is received and retained in aligned apertures in the inner plate 262, the hook 420 and the outer plate 280, and by a second pin 438 which projects from the forward wall 42 of the front block 22 into an aperture adjacent the rear end of the hook 420. The movable hook 422, a shaft 440 and an arm 442 comprise a crank which is operable to swing the hook 422 between its open and closed positions. The shaft 440 is rotatably journaled in an opening, not shown, in the inner plate 262 and extends into a recess 444 which is relieved in the front wall 42 of the front block 22 and opens rearwardly into the cavity 28. The hook 422 and the crank arm 442 are nonrotatably attached to the opposite ends of the shaft 440 so that a force applied to the crank arm 442 will pivot the shaft 440 and swing the hook 422. Such hook swinging force is applied to the crank arm 442 by means of a lever 446 which is pivotally mounted on the inner plate 262 on a pivot post 448 which projects into the front block cavity 28. The forward end of the lever 446 carries a pin 450 which interfittingly projects into a slot 452 formed in an enlarged crank arm portion 454 which projects toward and across the longitudinal center line of the cavity 28. A torsion spring 456 surrounds the pivot post 448 and has one end hooked about a pin 458 projecting from the inner plate 262 and its other end engaging with a pin 460 which depends from the lever 446 at a point between the pivot post 448 and the pin 450. The spring 456 exerts a constant bias upon the lever 446 which tends to pivot the lever 446 about the post 448 in a counterclockwise direction, as viewed in FIGS. 8 and 15, thereby rotating the crank arm 442, the crank shaft 440 and the hook 422 in a clockwise direction. It will be understood that the pin 450 and the slot 452 provide a driving connection between the lever 446 and the crank arm 442. With the tool parts in the condition shown in FIG. 8, the aforementioned cam block head 212 has a lateral side surface 464 which engages with a cam roller 462 rotatably pinned to the rear end of the lever 446. When the tool is actuated and the cam block head 212 moves forwardly to the position shown in FIG. 15, the roller 462 will roll down the curved cam surface 466 under the urging of the torsion spring 456; and, the lever 446, the crank arm 442 and the movable hook 422 will be spring biased to the closed position.

Figures 17, 22:
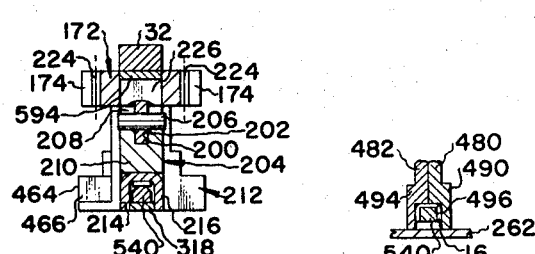
FIG. 17 is a tranverse sectional view of a cam block taken substantially along lines 17—17.
FIG. 22 is a partial sectional view taken along lines 22—22 of FIG. 13.

The stapler assembly 44 includes a pair of plates 480 and 482 which are held in clamped side-by-side relation by a screw 484. The exposed side wall of plate 480 includes a relieved portion 486 and spaced portions 488 and 490 which are of the original thickness of the plate 480. The other plate 482 includes a relieved portion 492 and a thicker portion 494. A channel 496 is defined between the plates 480 and 482, as shown in FIG. 22, and opens at opposite ends to the extreme front face of the plates and into a notch 498 cut out of the rear of portions 488 and 492 of the plates 480 and 482, respectively. The abutting side walls of the plates 480 and 482 are relieved to form a cavity 500 which houses a clock spring 502. One end of the spring 502 is secured to a square cross pin 504 penetrating plates 480 and 482 and the other end emerges from the cavity 500 and is soldered adjacent the rear end of a staple pusher bar 506. The front end portion 32a of the keel 32 overlies the upper edge of the joined plates 480 and 482 in the manner shown in FIG. 5; and, a pin 508 penetrates the keel portion 32a and seats in an interfitting recess in the plates. A bushing 510 transversely penetrates the plates 480 and 482 and extends to either side thereof to provide pivots for the staple levers 512 and 514 which are mounted on opposite sides of the plates. The rear portions of the levers 512 and 514 extend through the slot 40 in the front wall 42 of the front block 22 into the cavity 28 as shown in FIG. 5; and, between their rear ends, the levers 512 and 514 carry a cam roller 516 on a cross pin 518. Aligned apertures 520 in the rear portions of the levers 512 and 514 receive the laterally extending ears 521 of a spring support 522 which has an elongated tongue 524 extending between the plates and surrounded by a compression spring 526 which projects through an aperture 528 in the keel 32. The spring is constrained between the ears 521 and the front block wall overlying the aperture 528; and, it will be understood that the levers 512 and 514 are normally biased by spring 526 to the position shown in FIGS. 5 and 13 whereby the enlarged front toe portions 530 of the levers 512 and 514 are in a raised condition. A generally U-shaped cover plate 532 surrounds the sides and fronts of the plates 480 and 482 and is secured in assembled relation to the plates by a pair of screws 534 which thread into the aforementioned bushing 510. The open rear end of the cover plate 532 is disposed in the slot 40 of the front block 22; and, the front wall of the cover plate 532 is notched to receive an interfitting, U-shaped finger grip 538 that is rigidly attached to the front end of a staple rod 540. One open end of the cover plate 532 is closed by the inner plate 262 and its other end is closed by a flat plate 542 which is held to the front keel portion 32a by a screw 544.

The forward portion of lever 512 pivots about the bushing 510 in a cavity generally defined by relieved portion 486 of the plate 480 and the cover plate 532 while the lever 514 is similarly disposed in a cavity defined between the relieved portion 492 of plate 482 and the cover plate 532. A leg portion 546 of the ejector push plate 404 is reciprocable in the relieved portion 486 of plate 480 between the spaced portions 488 and 490 in response to pivoting of the lever 512 by means of a link 548 which carries spaced pins one of which interfits in an aperture 550 near the top of leg portion 546 and the other interfits in an aperture 552 in the lever 512. The ejector push plate 404 also has a foot portion 554 which is adapted to reciprocate in the ejector slot 386 and the slot 402 in the outer plate 280.

Figure 18:
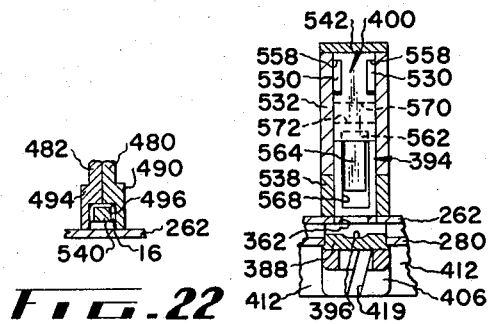
FIG. 18 is a transverse sectional view through the stapler assembly taken generally along lines 18—18 of FIG. 13.
Figure 19:
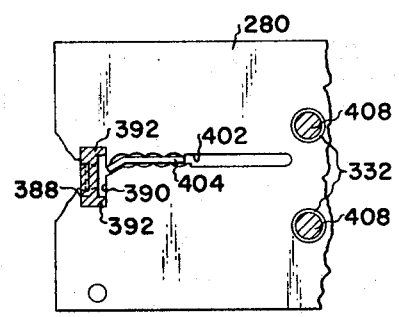
FIG. 19 is a fragmentary view taken substantially along lines 19—19 of FIG. 14.

The toe portions 530 of the levers 512 and 514 project forwardly from the front surfaces of the plates 480 and 482 into a chamber 556 generally defined between the plates and the front wall of the U-shaped cover plate 532. Also disposed in the chamber 556 are the staple hammer 400 and the cutter blade 394. As shown in FIG. 18, the toes 530 of the levers 512 and 514 are received in oppositely opening slots 558 near the top of the hammer 400. The hammer also has a transverse slot 560 in its rear surface in part defined by a wall 562 projecting rearward. A reduced toe portion 564 of the hammer 400 projects downwardly in the chamber 556, as viewed in FIGS. 5 and 13, and is driven downwardly by the counterclockwise pivoting of levers 512 and 514 to a lowered position wherein the end of the toe 564 passes through a close fitting opening 566 defined between the U-shaped finger grip 538 and a cross bar 568 secured thereto and stops in close proximity to the anvil 388.

As viewed in FIG. 18, the cutter blade 394 is rectangular and has a rectangular opening 568 therein through which projects the aforementioned wall 562 of the slot 560 in the hammer 400. When the hammer is drawn upwardly by the levers 512 and 514 as shown in FIGS. 5 and 18, the wall 562 will engage with the upper wall of the cutter blade opening 568 thereby lifting the blade upwardly. When the hammer is pushed downwardly by the levers 512 and 514 a certain amount of lost motion will occur between the hammer and the cutter blade which is represented by the distance between the wall 570 of the transverse slot 560 in the hammer and the upper wall 572 of the cutter blade. When this lost motion is taken up the hammer will bear against the cutter blade 394 driving its sharpened bottom edge 574 through the blade opening 368 in the inner plate 262 and between the arms 392 of the anvil 388. The cutter blade 394 is slidably guided for the aforedescribed reciprocal movement by the extreme front surface of the plates 480 and 483 and by the side walls of the U-shaped cover 532.

The staple rod 540 projects rearward from its point of attachment to the cross bar 568 of the finger grip 538, through the channel 496 between the plates 480 and 482 and then into the U-shaped staple channel 216. The forward end of the channel 216 seats in the notch 498 in the plates 480 and 482 and the rear end of the channel 216 seats in a slot 218 relieved in the rear wall 54 of the central block 20. The rear end of the staple rod 540 carries a locking block 318 which coacts with the staple rod release button 306 to lock the rod in its fully inserted position in the staple channel 216 or to release the staple rod so that it may be substantially withdrawn from the tool. In the locked condition, the pin 310 of the slide bar 308 is biased by spring 312 into interfering relation with the front end surface of the locking block 318; therefore, the staple rod cannot be intentionally or accidentally pulled or dropped from the front of the tool. The staple rod 540 is released for withdrawal from the channel 216 by moving the button 306 toward the center of the tool to compress the spring 312 and to move the slide bar pin 310 from in front of the locking block 318. The staple pusher bar 506 is U-shaped in transverse cross section and is slidable between the U-shaped wall of the staple channel 216 and the staple rod 540 which is generally square in transverse cross section. As shown in FIG. 5, the forward end of the staple rod 540 extends through the rectangular opening 568 in the cutter blade 394.

To load the tool with staples, the staple rod release button 306 is operated as hereinbefore described to release the locking block 318 at the rear end of the staple rod 540. The operator then grasps the finger grip 538 and pulls the rod forwardly through the staple channel 216 and the channel 496 thereby exposing the greater part of the rod at the front of the tool. A multiplicity of staples 16 are placed on the rod, in the manner shown in FIGS. 13 and 14, and as the rod is pushed rearwardly the rearmost staple will bear against the U-shaped front surface of the staple pusher bar 506 causing the bar to move rearwardly with the staples and the staple rod thereby winding the clock spring 502 tightly about the cross pin 504. The bias of the clock spring acts through the pusher bar 506 upon the staples 16 carried by the staple rod 540 to push the staples forwardly along the staple rod so that the frontmost staple 16a is pressed against the front wall of the U-shaped finger grip 538, as shown in FIG. 13. This frontmost staple 16a is thus spring urged into alignment with the opening 566 in the finger grip and lies directly in the path of travel of the toe portion 564 of the hammer 400. When the hammer is forced downwardly due to rotation of the levers 512 and 514, the foremost staple 16a will be engaged by the end of the hammer toe 564, pushed through the openings 566 and 362, and the depending legs of the staple will be bent inwardly as they are pushed into the staple bending recess 396.

From the foregoing, it will be understood that the levers 512 and 514 are pivotable about the bushing 510 to actuate the hammer 400, the cutter blade 394 and the ejector push plate 404. The levers 512 and 514 are pivoted from the condition shown in FIG. 13 to that shown in FIG. 14, by means of three cam surfaces 580, 582 and 584 formed on the front end of the reciprocable cam block head 212 which engage with the cam roller 516.

The tool is prepared for operation by loading a supply of staples 16 on the staple rod 540, in the manner shown in FIG. 14, and by inserting the tie material 68 into the tool housing 18 so that the forward end 434 thereof is positioned approximately as shown in FIG. 6. To load the staples 16 the operator must push the slide button 306 toward the center of the tool to move the pin 310 from in front of the locking block 318 so that the finger grip 538 may be pulley forwardly thereby drawing the staple rod from the front of the staple assembly 44. After the staples 16 are placed on the exposed portion of rod 540, the finger grip 538 is pushed rearwardly causing the rearmost staple on the rod to abut the front end of the staple pusher bar 506 whereby the latter is forced rearward drawing with it the clock spring 502 from the cavity 500. In this manner the spring 502 is conditioned to exert a continuous forward thrust on both the staple pusher bar 506 and the staples 16 which are slidable on the rod 540 so that the foremost staple 16a abuts the finger grip 538 and is disposed between and in alignment with the hammer toe 564 and the staple-bending recess 396 of the anvil 388. As the staple bar 540 is pushed rearwardly, the sloped rear end of the locking block 318 will cam the pin 310 and the slide bar 308 laterally so that the locking block 318 may pass the pin 310 to reach its fully inserted position shown in FIG. 6.

In loading the tie material 68 from a storage spool, or the like, not shown, into the tool, the leading end 434 of the tie is inserted into the passage 64 in the rear head 58 of cylinder block 24. The feed wheels 250 are then spread apart by pushing the wheel-release slide button 278 rearwardly whereby the pin 284 engages surface 286 to pivot the wheel release arm 260 so that the wheel shaft 252 is pivoted in its bearing 256 toward the side of the tool housing 18. With the wheels 250 so spread, the leading end 434 of the tie may be manually inserted forwardly between the wheels, through channel 320 and into the groove 322 of the lower clamping arm 324 to the approximate position shown in FIG. 6. To be sure that the tie material has been pushed forwardly into the tool sufficiently far, the leading end 434 thereof may be manually located so that it is visible in the guide channel 428 of the fixed hook 420. When the slide botton 278 is released, the spring 264 will act upon the wheel release arm 260 to bias the wheels 250 together for resiliently gripping the tie material in the wheel grooves 288.

The tool is intended to be powered by compressed air supplied thereto from a suitable source, not shown, by means of the flexible conduit 74; however, it will be understood from the foregoing description of the tool that hydraulic power means could be readily adapted to operate the cam block 204 and the rack return pistons 142.

After the tool is prepared for operation, the operator grasps the tool housing 18 in the manner shown in FIG. 1 so that the valve operating lever 98 underlies his thumb and the hooks 420 and 422 extend forwardly toward the wire bundle 10 so that the latter will pass between the open hooks. Preferably, the article or articles to be tied extends longitudinally at right angles to the plane in which the hooks lie.

With the tool connected to the air line 74, but with the valve lever 98 released, the tool parts will be in the relative positions shown in FIGS. 5, 6, 7, 8, 10, 13 and 18. When the valve lever 98 is depressed, the valve plug 94, 96 will connect pressure fluid to groove 104 and will vent groove 102 to atmosphere whereby the rear of the cylinder bore 46 will be pressurized and the piston 48 will move forwardly. The forward end of the cylinder bore 46 is exhausted through the flow regulating valve assembly 112 at a rate determinable by selecting the size of the aperture 124 in the valve front cap 120. By regulating the rate of exhaust from in front of the piston 48, the rate of forward travel of the piston and the attached cam block 204 may be governed to achieve a smooth coaction of the operating parts of the tool.

As the piston-actuated cam block 204 slides forwardly between the keel 32 and staple channel 216, the following operations occur more or less sequentially and in the order hereinafter discussed. First, the lost motion between the hook head 236 and the wall 240 of the groove 228 in the rack 172 is taken up so that the cam block 204 is in condition to pull the rack forwardly. At the same time, the cam block head 212 will have moved forwardly from the position shown in FIG. 8 to that shown schematically in FIG. 15 causing the cam roller 462 that is carried by the lever 446 to roll down the cam block rear surface 466 under the resilient urging of the torsion spring 456. The lever 446 will pivot in a counterclockwise direction thereby causing the connected arm 442, crankshaft 440 and movable hook 422 to pivot in a clockwise direction to close the arcuate hook heads 424 and 426 together about the article or articles disposed in the hook-defined opening 432. If the movable hook 422 does not fully close for any reason, the enlarged head 454 of the arm 442 will not swing laterally to the full extent shown in FIG. 15, but will remain projected into the path of forward travel of the cam block head 212 so that the movement of cam block 204 will be arrested to interrupt the cycle of the tool. This feature of the present invention is important as a means to signal the tool operator that the movable hook 422 has closed on a wire which should be in the hook opening 432. In this manner the operator can avoid incomplete ties about a cable which ties not only have a poor appearance, but could also present a safety hazard where closely spaced cables are concerned. Interruption of the tool cycle in case of incomplete hook closure will also stop the feeding of the tie material 68 so that jamming of the material in the tool is avoided.

Assuming that the hooks 420 and 422 close properly thereby permitting the cam block head 212 to pass the arm 442, the cam block will pull the rack 172 forwardly due to engagement of the hook head 436 and the groove 228. Forward movement of the rack has two effects, namely, the feed wheels 250 are rotated and the rack return pistons 142 are pushed forwardly in the bores 140.

As the wheels 250 rotate, the tie material therebetween is pushed forwardly through the channel 320 and the leading end 434 of the tie will be guided by the groove 322 for entering the wide rear opening of the fixed arm guide channel 428. The leading tie end 434 will then travel through the hook guide channels 428 and 430, around the wire bundle 10, and will finally emerge from the rear end of the guide channel 430 of the closed hook 426 and stop generally between the upper clamping lever 342 and the upstanding wall 380 of the clamping block 374.

The second function performed by the rack 172 as it is pulled forwardly by the cam block 204 is to engage with the exposed rear walls 170 of the pistons 142 and to push these pistons forwardly against the force of the pressure fluid acting in the front faces 178 of the pistons 142. In essence the pistons 142 coact with the pressure fluid in the bores 140 in the manner of fluid springs and such springs resiliently resist the forward movement of the rack 172 and are operable, upon release of the rack from the cam block 204, to drive the rack rearward.

As the end of the feed producing travel of the rack 172 is approached, but prior to disconnection of the rack and the cam block 204, the cam block head 212 will have advanced forwardly so that the arcuate cam surface 590 on the head will engage with the cam roller 354 carried on the rear end 344 of the upper clamping lever 342. As the roller 354 traverses cam surface 590, the upper clamping lever 342 is pivoted about the post 340 from the open position shown in FIG. 6 to the closed position shown in FIG. 16. In the closed condition, the lever 342 clamps the leading portion of the tie material between the serrated clamping surface 372 and the angled surface 384 on the wall 380 of the clamping block 374. The portion of the tie material extending rearwardly beyond this point of clamping generally overlies the ejector blade slot 386. Upon closure of the upper clamping arm, the slots 360 and 366 are brought into registration with the hammer opening 362 and the blade opening 368, respectively.

At this point in the cycle of the tool, the tie material surrounds the bundle of wires to be tied with the leading end 434 of the tie clamped as shown in FIG. 16. The next operation is that of drawing the tie material in a tight loop about the bundle 10 in the manner shown in FIG. 16. This is accomplished by the coaction of the rack 172 and the lower clamping arm 324 in the following way: Immediately after the upper clamping lever is fully closed on the leading end 434 of the tie, the ball 242 carried by the forwardly moving rack 172 will ride out of the forward end of the groove 244 and will depress the hook 232 to the released position shown in phantom lines in FIG. 5. In this released condition the cam block 204 is free to continue its forward movement and the rack 172 may be resiliently pushed rearward by the pistons 142. In response to rearward rack movement the feed wheels 250 will rotate in the reverse direction to pull the tie material running therebetween toward the rear of the tool. This pulling action of the wheels 250 will draw the tie radially out of the hook guide channels 428 and 430 into engagement with the wires causing the wires to form into a bundle 10 and to be held against the extreme front edges of the inner and outer plates 262 and 280, respectively. When the loop is tight, the wheels 250 will stop rotating and, depending on the size of the loop, the free rearward movement of the rack will be arrested at a point between its extreme operating positions shown in full lines and in phantom lines in FIG. 5. The piston bores 148 receive a charge of pressure fluid through the ports 176 just as the rack 172 is about to be released from the cam block 204. Therefore, the rearwardly directed pressure force of the pistons 142 will increase as the pressure fluid escapes from the piston bores 142 through the metering aperture 152 in the guide rod head 146. This is desirable so that the full rearward force of the pistons is not applied to the rack instantaneously upon release of the rack causing the latter to accelerate too rapidly with the attending risk of breaking the tie material or of pulling the leading tie end from between the clamping lever 342 and the clamping block 374. From the foregoing description, it will be appreciated that the pistons 142, the rack 172 and the wheels 250 are effective for tightening the tie material in a loop about a bundle 10 without regard to the perimetrical size or shape of the bundle and without the use of mechanically complex devices such as slip clutches, or the like.

As the rack is moved rearwardly to rotate the wheels 250 for drawing the loop about the bundle 10, the cam surface 270 on the cam block head 212 engages with the cam roller 336 carried on the rear end of the lower clamping lever 324 to pivot the lever 324 about the post 332 from the open position shown in FIG. 6 to the closed position shown in FIG. 16. In order to insure that the wheels 250 have fully tensed the loop about the bundle 10, the slope of the cam surface 270 is chosen so that the fully closed condition of the lower clamping lever 324, as viewed in FIG. 16, is achieved substantially after the rack 172 has been released from the cam block 204. In the closed condition, the clamping lever, secures the tie material between the serrated clamping surface 370 and the surface 382 of wall 380; and, the slots 358 and 370 in this clamping lever register with the hammer opening 362 and the blade opening 368, respectively.

At the point in the tying cycle represented by FIG. 16, the power piston 48 has advanced the cam block 204 so that the rack 172 is released and pushed rearwardly by the pistons 142; and, the cam block head 212 has closed the levers 324 and 342 to secure the ends 14 of the loop 12 about the bundle 10 in condition for applying a staple 16 thereto. Generally, the staple assembly 44 functions to apply a staple 16 to the ends 14 of the loop, to cut off the loop 12 from the leading end 434 and from the stock of tie material to the rear of the loop, and to eject the cut-off leading end 434 from the tool housing 18 as scrap. These three functions occur sequentially as the cam surfaces 580, 582 and 584 on the cam block head 212 engage with the roller 516 carried by the levers 512 and 514 to pivot the levers as a unit about the bushing 510 from the raised condition shown in FIGS. 5, 7 and 13 to the lowered condition shown in FIG. 14. As the cam surface 580 engages the roller 516, the hammer 400 is forced downwardly, as viewed in FIGS. 13 and 14, whereby the toe 564 of the hammer engages the foremost staple 16a pushing the latter through the hammer opening 362 in the inner plate 262. The clamped loop ends 14 overlie the hammer opening and the legs of the staple 16a will pass to the sides of the loop ends and the top of the staple will overlie both of the loop ends. At the bottom of the hammer travel, the staple legs will be bent inwardly against the loop ends 14 as the legs are pressed into the bending recess 396 of the anvil 388. As the hammer 400 moves downwardly the lost motion between the hammer and the cutter blade 394 is taken up and the blade 394 slides downwardly through the blade opening 368 in the inner plate 262 toward the loop ends 14. At the same time the hammer 400 and the cutter blade 394 are moving downwardly, the scrap ejector plate 404 is pushed downwardly by lever 512 so that the foot portion 554 thereof enters the slot 386 and contacts the leading end 434 of the tie material which is to be cut off and ejected. As the roller 516 traverses the cam surface 580, the staple 16 is substantially crimped about the loop ends 14, the blade 394 engages with the loop ends and the scrap ejector pushes the leading tie end 434 into the slot 402 in the outer plate 280. As the cam roller 516 traverses the cam surfaces 582 and 584, the staple 16 is fully set, the loop ends 14 are severed by the blade 394 and the scrap ejector blade 404 ejects the severed leading tie end 434 from the slot 402 into the slot 419 of the beam 406.

In order that the leading end 434 of the tie be fed by the wheels 250 to approximately the point shown in FIG. 16 on each operating cycle, it is necessary that the leading end 434 remain at about the same position shown in FIG. 6 when the loop ends 14 are severed by the blade 394. Such uniformity of feed on each cycle is not possible unless the rearward pull exerted by the rack 172 and the associated pistons 142 for tightening the loop 14 is relieved before the loop ends 12 are severed; otherwise the severed end of the tie would be pulled rearwardly until the rack seated in its rearmost position and the distance the rack would travel rearwardly would depend on the size of the previous loop. To obviate this possibility, the cam block surface 170 contacts the roller 268 carried at the forward end of the wheel-release lever 260 and pivots the wheel shaft 252 to spread the wheel 250 out of reverse driving engagement with the tie material therebetween thereby permitting the rack to be pushed rearwardly by the pistons 142 to a rear limiting position, shown in FIG. 5, established by the abutment of the rack body portion 226 and a stop plate 592. The stop plate 592 is removably secured to the rear end of the keel 32 by a screw 594 so that the plate 592 may be replaced by another stop plate dimensioned longitudinally either to decrease or to increase the distance the rack travels. By varying the forward travel of the rack, the position of the leading tie end 434 with respect to the cutter blade, as viewed in FIG. 16 can be varied to provide the most desirable length for the severed scrap portion of tie material.

If the valve lever 98 is held in the depressed position the tool parts will remain in the aforedescribed condition i.e. the cam block 204 is driven to its foremost position, the rack 172 is returned to its rearmost position, the hook 422 is closed, the clamping levers 324 and 342 are closed on the loop ends 14, the hammer, cutter blade and scrap ejector are all lowered and the wheels are spread by the release lever 270. When the valve 80 is returned to the condition shown in FIG. 10, the piston will be driven rearwardly causing the cam block to move rearwardly out of engagement with the cam roller 518 whereby the staple assembly 44 is returned to the condition shown in FIG. 13. As the hammer toe 564 is raised from in front of the staple rod 540, the clock spring 502 and the staple pusher 506 will act on the row of staples 16 to push the foremost into proper alignment between the hammer 400 and the anvil 388. As the cam block head moves still farther rearwardly, the wheel release lever 270 will be returned to its normal position and the wheel pinions 254 will engage with the rack 172. The clamping levers 324 and 342 will be released and the loop ends 14 will be freed. The cam block 204 and the rack 172 are again connected as hook head 236 is pivoted downwardly as it engages the front wall of the body portion 226 of the rack 172 and is biased into the groove 228 by the spring 238. Finally, the roller 462 on the lever 446 will move along the cam surface 466 to rest on the side surface 464 of the cam block head 212 thereby pivoting the movable hook 422 to the open position shown in FIG. 8.

It will be understood that the above description and accompanying drawings comprehend only one embodiment of the invention and that various changes in construction, proportion, materials, and arrangement of the elements thereof may be made without sacrificing any of the above recited advantages or departing from the scope of the appended claims.

What I claim as my invention is:

1. A mechanical tying apparatus for assembling a tie in a loop about an article, comprising:
   (a) housing means;
   (b) linearly reciprocating power means disposed in said housing means;
   (c) operating means attached to said power means for linear reciprocal movement therewith;
   (d) tie guiding means mounted on said housing means and being movable by said operating means to an open condition for receiving said article and being movable to a closed condition to surround said article;
   (e) reversible feed means disposed in said housing means and drivable in a forward direction by said operating means for feeding the leading end of a tie to said tie guiding means to form a loop about said article;
   (f) feed reversing means disposed in said housing means and coacting with said feed means for driving the latter in a reverse direction for pulling said tie to draw said loop tightly about said article;
   (g) clamping means mounted on said housing means and operable by said operating means to clamp the ends of said loop in juxtaposition;
   (h) fastening means mounted on said housing means and operable by said operating means for applying a fastener to the clamped ends of said loop; and (i) cutter means mounted on said housing means and operable by said operating means to sever the fastened-together ends of said loop.

2. The invention according to claim 1, wherein:
(a) said reversible feed means includes rotatable means engageable with said tie for alternately feeding and pulling said loop; and
(b) said rotatable means is reversibly rotatable by reciprocable rack means which coact with pinion means carried by said rotatable means.

3. The invention according to claim 2, wherein:
(a) said rack means is releasably connected with said power means and driven thereby in the forward direction; and
(b) said feed reversing means coacts with said rack and opposes movement of the same in the forward direction and is operable, upon disconnection of said rack means from said power means, to move said rack means in the reverse direction.

4. The invention according to claim 3, wherein:
(a) said feed reversing means comprises extensible piston means projecting into said housing means and engaging with said rack means for exerting a force on said rack in the reverse direction.

5. The invention according to claim 2, wherein:
(a) said rotatable means comprises a pair of drive wheels which are spring biased into rolling engagement with said tie;
(b) one of said shafts being tiltable about one end thereof to spread one of said wheels out of driving engagement with said tie; and
(c) wheel spreading means mounted in said housing means and operable to spread said wheels as aforesaid for interrupting the pull exerted by said wheels on said loop.

6. The invention defined in claim 1, wherein said tie guiding means includes:
(a) a pair of arms extending from said housing means with at least one arm being swingable away from the other arm to an open condition for receiving said article and said one arm being swingable toward the other arm to a closed condition wherein said article is surrounded by said arms.

7. The invention according to claim 6, wherein:
(a) said at least one swingable arm has a portion thereof which is positionable in said housing means for interfering with movement of said power means when said arms are not closed thereby interrupting the feeding of said loop around said article.

8. The invention defined in claim 1, wherein:
(a) said operating means is slidable along the length of said housing means;
(b) said reversible feed means and said operating means are releasably connected by locking means which is released when said feed means reaches a predetermined point along the length of the housing means; and
(c) upon release of said locking means, said operating means and said reversible feed means are driven in opposite directions in said housing means by said power means and said feed reversing means, respectively.

9. The invention defined in claim 8, wherein:
(a) said clamping means is closable by said operating means to clamp the leading end of said loop whereby the loop can thereafter be pulled tightly around said article by said feed reversing means; and
(b) said clamping means is closed by said operating means before said locking member is released.

10. The invention defined in claim 1, wherein said operating means includes:
(a) a cam block having plural cam surfaces thereon which coact with and sequentially operate said tie guiding means, said clamping means, said fastening means and said cutter means.

References Cited

UNITED STATES PATENTS

| | | | |
|---|---|---|---|
| 3,250,209 | 5/1966 | Gage et al. | 100—26 |
| 2,549,626 | 4/1951 | Mosey | 140—93.2 |
| 2,684,003 | 7/1954 | Klingler. | |
| 3,075,198 | 1/1963 | Over. | |
| 3,314,135 | 4/1967 | Smith. | |
| 3,328,872 | 7/1967 | Reem et al. | 140—121 X |

THOMAS H. EAGER, *Primary Examiner.*